_United States Patent Office_

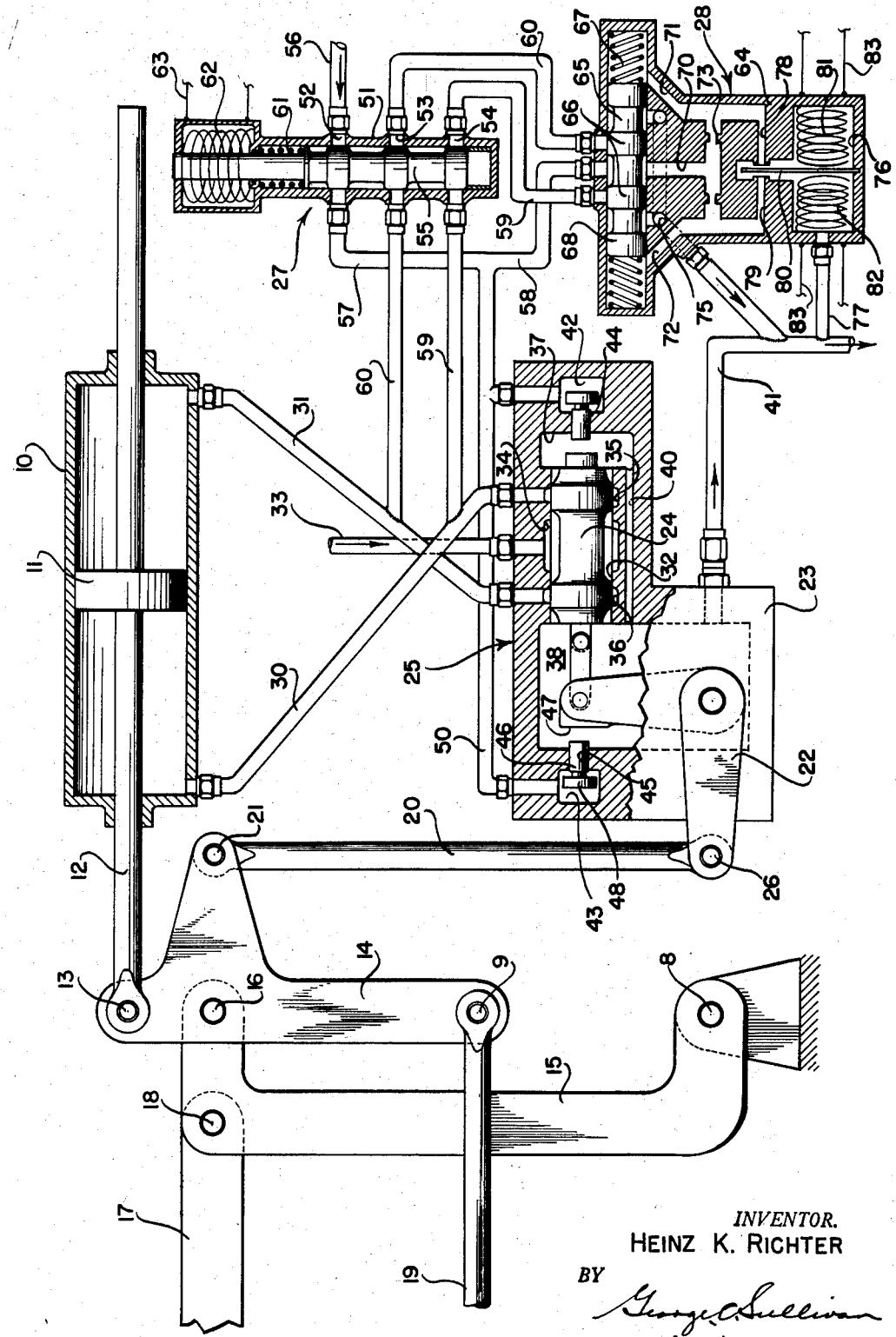

2,738,772
Patented Mar. 20, 1956

2,738,772

AUTOMATIC PILOT-HYDRAULIC BOOSTER SYSTEM

Heinz K. Richter, Los Angeles, Calif., assignor to Lockheed Aircraft Corporation, Burbank, Calif.

Application July 21, 1954, Serial No. 444,687

10 Claims. (Cl. 121—41)

This invention relates to the actuation of the aerodynamic control surfaces of aircraft and relates more particularly to combined automatic pilot-hydraulic booster actuating systems for such control surfaces.

Booster systems are employed extensively in modern aircraft to amplify the control forces which the pilot applies to the control stick and pedals. The hydraulic amplifiers, or boosters, are designed to feed a portion of the aerodynamic loads on the control surfaces back to the control stick to provide a suitable "feel" or, in some cases, are in the nature of irreversable power servos having artificial feel means connected with the control stick or control stick linkage. When automatic pilots are required it is customary to connect the automatic pilot servo to the pilot control stick input end of the hydraulic booster or power control servo just as though the control system of the airplane did not embody the hydraulic amplifier or booster. In another hydraulic-automatic pilot system that has been introduced, a low power electro-hydraulic transfer valve is used to control or drive the booster valve hydraulically and this, in turn, controls or drives the booster actuator. In both of these earlier methods of tying the automatic pilot (autopilot) to the booster control system there are two servos arranged in cascade relation and the response is slow, especially when the hydraulic booster valve has a built-in or inherent dead zone which is often the case. Furthermore, due to the complexity of the earlier systems, their elasticity, etc. they are subject to spurious oscillation, especially when on autopilot control.

It is a general object of the present invention to provide a practical, dependable, hydraulic-autopilot control system that is much less complex than the earlier systems of this kind and that overcomes the defects and shortcomings of the earlier arrangements.

Another object of the invention is to provide a hydraulic booster-autopilot control system of this character in which the manually operated booster control valve and the autopilot control valve are connected in parallel relation to each operate independently of the other. Due to this parallel relationship of the valves each may be better designed to perform its specific functions.

Another and important object of the invention is to provide a system of the class referred to in which the autopilot servo control system constitutes a simple single loop which is much simpler, lighter in weight, and cheaper to manufacture than either the two-loop system employing the electro-hydraulic transfer valve or the cascaded servo systems heretofore employed.

A further object of the invention is to provide a system of the character referred to in which the pilot may readily apply sufficient manual force when the autopilot is in operation to move the manual booster control valve from its neutral position so as to hydraulically override any existing autopilot signal. This constitutes a definite safety feature, permitting immediate manual control when desired or necessary.

A still further object of the invention is to provide a system of this kind in which control forces of only limited magnitude can possibly result in the event of hard over-signal failure of the autopilot although there is no restriction on the speed of response of the servo means during normal autopilot operation.

Other objects and features of the invention will become apparent from the following detailed description of a typical preferred embodiment illustrated in the accompanying drawings in which:

The figure is a more or less diagrammatic view of a system incorporating the invention with the booster actuator and the valves appearing in cross section.

The drawing illustrates the invention incorporated in a hydraulic booster-automatic pilot system for an aerodynamic control surface, not shown, of an airplane, the system including a hydraulic booster actuator shown in a conventional manner. This actuator includes a cylinder 10, a piston 11 operable in the cylinder, and a piston rod 12 extending from the cylinder. The piston rod 12 is connected at 13 with a link or lever 14 which, in turn, is pivoted on a lever 15 at the point or bearing 16. The opposite end of the lever 15 is pivotally supported on a relatively stationary mount at 8. A rod 17, or the equivalent, is pivotally connected with the link or lever 15 at 18 and extends to the control surface, not shown. A pilot-force input rod or "feel" rod 19 is pivotally connected with an end of the lever 14 at 9. A vertical link 20 is pivotally connected with a branch or arm of the lever 14 at 21 and extends to a bell crank 22. The bell crank 22 is pivotally mounted in a valve housing 23 and has an end or arm operatively connected with the axially movable spool 24 of the boost control valve designated by the general reference numeral 25. The vertical link 20, above mentioned, is pivotally connected at 26 with the other end or arm of the bell crank 22. The linkage just described is illustrated in the drawings in a neutral position where the boost control valve spool 24 is in a neutral position. The pilot initiated force on the push-pull feel bar 19 will rotate the lever 14 about the pivot mounting 13, the control surface rod 17 being simultaneously moved slightly. The rotation or angular movement of the lever 14 produces movement or axial displacement of the link 20 to in turn angularly displace the bell crank 22. This, in turn, moves the valve spool 24 to supply actuating fluid pressure to the cylinder 10, as will be later described, and the piston rod 12 is moved to actuate the control surface rod 17. The hydraulic pressure acting on the piston 11 in the cylinder 10 creates a force proportional to the force supplied to the push-pull feel bar 19 by the pilot and these combined forces move the aerodynamic control surface of the airplane. Because the pilot supplies a portion of the force required to move the control surface, he has a continuous "feel" of the aerodynamic load on the surface. When movement of the push-pull feel bar 19 is discontinued, fluid pressure in the cylinder 10 continues to move the rod 17 and to pivot the lever 14 about its pivotal connection 9 with the bar 19. This latter motion restores the spool 24 to its neutral position. The present invention is not primarily concerned with the details of the linkage just described except insofar as the linkage is used in combination with the other elements of the hydraulic booster-automatic pilot system and it should be understood that other appropriate linkages having like functions may be employed if so desired.

The hydraulic booster-autopilot system of the invention may be said to comprise, generally, the boost actuator 10—11, the boost control valve 25, an autopilot shut-off valve 27 and an autopilot control valve 28.

The hydraulic boost actuator 10—11 has been described above, this unit comprising the cylinder 10, the piston 11 and the rod 12. The actuating fluid pressure or hydraulic pressure is admitted to the opposite ends of the cylinder 10 by pipes or lines 30 and 31.

The control valve 25 is manually controlled or actuated by the above described linkage and serves to control the delivery of the actuating fluid pressure to the lines 30 and 31 of the cylinder 10. In this connection it may be observed that the control valve 25 normally operates only during pilot operation or control of the system and, therefore, can be best designed to perform its specific manual control functions.

The casing or housing 23 of the valve 25 has an axial bore 32 in which the spool 24 is free to move axially. An hydraulic pressure supply line 33 communicates with a central or intermediate annular groove 34 in the wall of the bore 32. Annular grooves 35 and 36 are spaced from the ends of the pressure supply groove 34 and the lines 30 and 31 respectively, leading to the cylinder 10, communicate with these grooves 35 and 36. The valve spool 24 has two spaced annular lands related to fully cover the cylinder grooves 35 and 36 when the spool is in the neutral position illustrated. The valve casing 23 has pressure return chambers 37 and 38 at the opposite ends of the spool bore 32 and these two chambers are connected by an internal port 40. A pressure return line 41 of the hydraulic system communicates with the larger chamber 38 to bleed off the return fluid. The chamber 38 contains the inner arm of the crank 22. It will be seen that when the spool 24 is moved or displaced in one direction the cylinder line 30 is put in communication with the pressure supply line 33 and the cylinder line 31 is placed in communication with the pressure return chamber 38 and the return line 41. When the spool 24 is moved in the other direction, the cylinder line 31 is put in communication with the pressure supply line 33 and the cylinder line 30 is placed in communication with the return line 41.

The manual boost control valve 25 further includes hydraulically actuated means responsive to or controlled by the shut-off valve 27 and operable to hold the spool 24 in the neutral position where the cylinder lines 30 and 31 are both closed. This means includes pressure chambers 42 and 43 in the valve casing 23. These chambers 42 and 43 are axially aligned with the spool cylinder or bore 32 and are respectively spaced adjacent the pressure return chambers 37 and 38. Openings or bores 44 and 45 extend from the pressure chambers 42 and 43 respectively to the adjacent pressure return chambers 37 and 38 and pins or plungers 46 are slidable in these bores. The bores 44 and 45 and their plungers 46 are preferably coaxial with the valve spool 24 and the plungers are adapted to extend into the adjacent chambers 37 and 38 for cooperation with the valve spool assembly. The spool 24, as shown, has an end which extends into the chamber 37 when the spool is in the neutral position and the adjacent plunger 46 is engageable therewith. Where, as illustrated in the drawing, the crank 22 is operatively connected with one end of the valve spool 24 the crank may have a land or face 47 to be engaged by the plunger 46 operating in the adjacent bore 45. The plungers 46 have heads or flanges 48 adapted to engage the inner walls of their respective chambers 42 and 43 to limit movement of the plungers toward the valve spool assembly. The parts are constructed and related so that the plungers 46 operate to centralize or locate the valve spool 24 in its neutral or closed position where the cylinder lines 30 and 31 are closed when the heads or flanges 48 of the plungers 46 are stopped against the inner walls of their respective chambers 42 and 43. A pressure supply manifold or line 50 communicates with the chambers 42 and 43. The line 50 is controlled by the shut-off valve 27 and delivers hydraulic pressure to the chambers to actuate the plungers 46 when the valve 27 is opened. As will be later described, the effective cross sectional area of the plungers 46 and the effective hydraulic pressure are related to the manual control linkage so that the pilot may readily apply sufficient manual force to overcome the hydraulically actuated centering plungers 46 and move the valve spool 24 manually as desired, thus overriding the autopilot.

The shut-off valve 27 is responsive to signals from the autopilot, not shown, to supply actuating fluid pressure to the autopilot control valve 28 and to the spool centralizing pressure chambers 42 and 43 of the boost control valve 25. The valve 27 is electrically operated and includes a casing or housing 51, having three spaced pairs of aligned transverse ports 52, 53 and 54 and a spool 55 operable in the casing to control the ports. One port 52 is in communication with a pressure supply line 56 while a line 57 extends from the other port 52 to the above mentioned line 50, which leads to the chambers 42 and 43. The line 57 also has a branch 58 extending to the autopilot control valve 28 to supply actuating fluid pressure thereto. A line 59 extends from the cylinder pipe 30 to one port 54 of the shut-off valve and continues from the other port 54 to control valve 28. A similar line 60 extends from the cylinder pipe 31 to one port 53 and continues from the other port 53 to the autopilot control valve 28. The spool 55 of the shut-off valve 27 is normally urged to the closed position illustrated by a spring 61 and when in this position the spool closes the three sets of ports 52, 53 and 54. A solenoid winding 62, having energizing leads 63 extending to the autopilot, not shown, is operable when energized to move the spool 55 to the open position where the three sets of ports 52, 53 and 54 are open for the individual flow of fluid therethrough. Thus when the spool 55 is in the closed position the three lines 57, 59 and 60 are closed and when the spool 55 is in the open position these three lines are open for the flow therethrough of the hydraulic fluid under pressure. It should be observed that when the autopilot is put into operation the winding 62 is energized and the spool 55 is moved to the open position so that fluid pressure is supplied to the chambers 42 and 43 of the boost control valve 25 to actuate the plungers 46. The plungers 46 remain actuated to hold the spool 24 in its centralized and neutral position so long as the autopilot remains in operation and, therefore, the boost control valve 25 remains immobilized during autopilot operation. However, the pilot may overpower the plungers 46 to manually move the spool 24 even during autopilot operation if this becomes necessary.

The autopilot control valve 28 is responsive to signals from the autopilot to control the admission of hydraulic actuating pressure to the lines 59 and 60 and thus control actuation of the piston 11. The valve 28 includes a casing 64 in which a spool 65 is slidable or movable to control the terminii of the lines 59 and 60. The spool 65 has two spaced enlargements or lands 66 which close the lines 59 and 60 when the spool is in its neutral or closed position. Springs 67 act against plunger heads 68 on the ends of the spool to yieldingly center the spool 65 in its closed position. The casing 64 has a port 70 communicating with the pressure supply branch line 58 and has ports 71 and 72 leading to the ends or plunger heads 68 of the spool 65. Restrictors 73 are provided between the pressure port 70 and the end ports 71 and 72. Pressure bleeds 75 extend from the areas between the lands 66 and the heads 68 of the spool 65 to the pressure return line 41.

The valve casing 64 also has a pressure return chamber 76 connected with the return line 41 by a pipe 77. Pressure control ports 78 and 79 extend from the end ports 71 and 72 respectively to the chamber 65 and are controlled by a reed valve 80. So long as the reed valve 80 is in its neutral position shown in the drawings, pressure bleeds equally or uniformly from the ports 71 and 78 and 72 and 79 so that the spool 65 remains in its centralized position where the lines 59 and 60 are both closed and out of communication with the pressure supply branch line 58. The reed valve 80 is responsive to signals from the autopilot, not shown. Electromagnetic windings or coils 81 and 82 are arranged at opposite sides of the reed valve 80 and leads 83 carry signals from the autopilot to the coils. Upon the coils 81 and 82 receiving differential signals from the autopilot the reed valve 80 is moved one way or the other to close or restrict one of the ports 78 or 79. When the reed valve 80 closes the port 78, pressure builds up in the port 71 and this pressure, acting on the related spool plunger 68, moves the spool 65 to the position where the line 59 is in communication with the pressure supply branch 58 and the line 60 is put into communication with the pressure return port 75. Accordingly, the piston 11 of the boost actuator is moved to the right to actuate the aerodynamic control surface. When the reed valve 80 restricts the port 79, pressure builds up in the related port 72 and this pressure, acting on the respective spool plunger 68, moves the spool 65 to a position where the cylinder line 60 is in communication with the pressure supply branch line 58 and the line 59 is in communication with the pressure return port 75. This provides or produces movement of the piston 11 to the left and corresponding actuation of the aerodynamic control surface. As illustrated in the drawings the fluid flow capacity or rating of the boost control valve 25 is much greater than the fluid flow capacity or rating of the autopilot shut-off valve 27 and control valve 28. It should be noted that the manually actuated boost control valve 25 remains idle during the periods when the autopilot, acting through the medium of the valve 28, controls actuation of the aerodynamic surface. Accordingly, the response is more rapid, more accurate, and less subject to unwanted oscillation, etc.

It is believed that the features and operation of the system of the invention will be readily apparent from the foregoing and detailed description. As described above, when the autopilot is "off" manual operation of the push-pull feel bar 19 results in displacement or movement of the spool 24 of the boost control valve 25 and this movement of the spool regulates or controls the cylinder lines 30 and 31 to provide for the desired or required actuation of the piston 11 in the boost cylinder 10. During such operations the shut-off valve 27 is closed and no pressure is applied to the plungers 46 so the plungers do not resist or interfere with free movement of the spool 24 of the control valve 25, the plunger line 50 being open to the pressure return 77 through branch 58, port 70, ports 78 and 79 and chamber 76. On the other hand, when the autopilot is "on" the shut-off valve 27 is open and the actuating pressure is admitted through the lines 50 and 57 to the cylinders 42 and 43 to actuate the plungers 46 inwardly toward the opposite ends of the spool assembly. The plungers 46 are actuated inwardly until their flanges 48 stop against the inner walls of the chambers 42 and 43 and when the plungers are in this position they serve to centralize the spool 24 in the position where the lines 30 and 31 to the cylinder 10 are both closed. The centralizing action of the plungers 46 on the spool 24 serves to neutralize or immobilize the valve 25 during autopilot actuation. Accordingly, during autopilot control through the medium of the valve 28, the piston 11 of the boost actuator is actuated directly by the fluid pressure supplied through the lines 59 and 60 and 30 and 31 to govern actuation of the aerodynamic surface and the valve 25 remains idle. However, should it become necessary or desirable, the pilot may, during autopilot operation, actuate the bar or rod 19 in a manner so as to overpower the centralizing plungers 46 and to move the spool 24 and thus assume or take over control of the boost actuator piston 11. Thus if there is an existing autopilot signal operating the valve 28 to produce an unwanted or excessive displacement or movement of the control surface the pilot may manually move the spool 24 of the boost control valve 25, to overpower the plungers 46, and to cause actuation of the piston 11 in a direction to neutralize or compensate for such unwanted or excessive movement. Since the flow rating of the boost valve 25 is much greater than that of the autopilot valves 27 and 28 fluid pressure is delivered through a line 30 or 31 from the valve 25 to the cylinder 10 to produce such actuation of the piston 11 even though some fluid pressure may bleed out through the more restricted valves 27 and 28 which remain active due to the existing autopilot signal.

Having described only a typical form of the invention I do not wish to be limited to the specific details herein set forth, but wish to reserve to myself any variations or modifications that may appear to those skilled in the art and fall within the scope of the following claims.

I claim:

1. In combination; a cylinder and piston mechanism having actuating fluid pressure supply and discharge lines, a manually operable valve for controlling said lines to actuate said mechanism, said valve including a manually movable fluid pressure flow controlling element, electrically operated valve means for controlling the flow of fluid pressure in said lines, and means associated with said valve and responsive to said valve means for holding said element against movement when said electrically operated valve means is energized.

2. In combination; a cylinder and piston mechanism having actuating fluid pressure supply and discharge lines, a manually operable valve for controlling said lines to actuate said mechanism, said valve including a manually movable fluid pressure flow controlling element having operative positions where said lines are open and a closed position where said valve closes said lines, electrically operated valve means for controlling the flow of fluid pressure to and from said mechanism, and means controlled by said valve means for holding said element in said closed position when the electrically operated valve means is controlling said flow of fluid pressure.

3. In combination; a cylinder and piston mechanism having actuating fluid pressure supply and discharge lines, a manually operable valve for controlling said lines to actuate said mechanism, said valve including a manually movable fluid pressure flow controlling element having operative positions where said lines are open and a closed position where said valve closes said lines, electrically operated valve means for controlling the flow of fluid pressure to and from said mechanism, and fluid pressure actuated means controlled by said valve means for holding said element in said closed position when the electrically operated valve means is controlling said flow of fluid pressure.

4. In combination; a cylinder and piston mechanism having actuating fluid pressure supply and discharge lines, a manually operable valve for controlling said lines to actuate said mechanism, said valve including a manually movable fluid pressure flow controlling element having operative positions where said lines are open and a closed position where said valve closes said lines, electrically operated valve means for controlling the flow of fluid pressure to and from said mechanism, and fluid pressure actuated plungers controlled by said valve means for holding said element in said closed position when the electrically operated valve means is energized.

5. A booster-autopilot system for operating a control surface comprising a fluid pressure operable boost actuator having actuating fluid pressure supply and return lines, a manually operable valve for controlling said lines and including a movable valve member having operative positions where said lines are open and a closed position where said valve closes the lines, an autopilot control valve electrically in parallel relation to the first named valve and operable to control said lines to actuate the actuator, an electrically operated cut-off valve operable when open to supply actuating fluid pressure to said control valve, and plunger means at the manually operable valve actuated upon opening of the shut off valve to retain said valve member in said closed position when the cut off valve is open.

6. In a booster-autopilot system for operating a control surface the combination of; a fluid pressure operable booster for applying force to the surface, a control valve for controlling the booster including a movable valve member, electrically operable valve means in parallel relation to the control valve and also operable to control the booster, fluid pressure actuated means for holding the valve member in a closed position when the electrically operable valve means is in control of the booster, and manually operable means for moving the valve member and capable of overpowering the last named means.

7. In a booster-autopilot system for operating a control surface the combination of; a fluid pressure operable actuator for applying force to the surface and having actuating fluid pressure lines, a control valve for controlling the flow of actuating fluid to and from said lines including a movable spool having active positions and a closed position where said lines are closed, fluid pressure operable plungers for retaining the spool in said closed position, electrically operable valve means connected with said lines in parallel relation with the control valve and operable to control the flow of actuating fluid pressure to and from the actuator, a line controlled by said valve means to supply actuating fluid pressure to said plungers so long as said valve means is operating to hold the control valve idle, and manually operable means for moving said spool to control the actuator and operable to overpower said plungers.

8. In a booster-autopilot system for operating a control surface the combination of; a fluid pressure operable actuator for applying force to the surface and having actuating fluid pressure lines, a control valve for controlling the flow of actuating fluid to and from said lines including a movable spool having active positions and a closed position where said lines are closed, fluid pressure operable plungers associated with the control valve and operable against the opposite ends of the spool for retaining the spool in said closed position, electrically operable valve means connected with said lines in parallel relation with the control valve and operable to control the flow of actuating fluid pressure to and from the actuator, a line controlled by said valve means to supply actuating fluid pressure to said plungers so long as said valve means is operating to hold the control valve idle, and manually operable means for moving said spool to control the actuator and operable to overpower said plungers.

9. In a booster-autopilot system for operating a control surface the combination of; a fluid pressure operable actuator for applying force to the surface and having actuating fluid pressure lines, a control valve for controlling the flow of actuating fluid to and from said lines including a movable spool having active positions and a closed position where said lines are closed, fluid pressure operable plungers for retaining the spool in said closed position, an electrically controlled autopilot valve connected with said lines in parallel relation with said control valve and operable to control the flow through said lines, a fluid pressure line extending to said plungers, a shut-off valve operable to supply fluid pressure to said autopilot valve for said lines of the actuator and to simultaneously supply fluid pressure to said line to actuate the plungers, and manually operable means for moving the spool to control the actuator and operable to overpower said plungers.

10. In a booster-autopilot system for operating a control surface the combination of; a fluid pressure operable actuator for moving the surface and having actuating fluid pressure lines, a control valve for controlling the flow of actuating fluid to and from said lines including a casing and a valve spool movable in the casing between active positions and a closed position where said lines are closed, said casing having two pressure chambers, a pressure supply line leading to the chambers, plungers of limited effective diameter operable in the chambers by pressure from said line to hold the spool against movement, an electrically controlled autopilot valve operable to admit pressure to said line so that the plungers hold the spool against movement and at the same time control the pressure lines leading to the actuator whereby the actuator is under autopilot control while the spool is thus held, and manually operable means for moving the spool to control the actuator and related to the plungers of limited diameter to overpower the plungers when the actuator is under autopilot control.

References Cited in the file of this patent

UNITED STATES PATENTS

| | | |
|---|---|---|
| 702,979 | Martin | June 24, 1902 |
| 1,375,269 | Akemann | Apr. 19, 1921 |
| 2,365,075 | Hassman | Dec. 12, 1944 |

FOREIGN PATENTS

| | | |
|---|---|---|
| 598,884 | Great Britain | Feb. 27, 1948 |